United States Patent
Qi (10) Patent No.: US 7,880,769 B2
(45) Date of Patent: Feb. 1, 2011

(54) ADAPTIVE IMAGE STABILIZATION

(75) Inventor: Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 10/779,246

(22) Filed: Feb. 13, 2004

(65) Prior Publication Data
US 2005/0179784 A1 Aug. 18, 2005

(51) Int. Cl.
H04N 5/228 (2006.01)
(52) U.S. Cl. .............. 348/208.99; 348/208.1; 348/208.2; 348/208.3; 348/208.4; 348/208.5; 348/208.6
(58) Field of Classification Search .. 348/208.99–208.6
See application file for complete search history.

(56) References Cited

U.S. PATENT DOCUMENTS

| | | | | |
|---|---|---|---|---|
| 5,012,270 | A * | 4/1991 | Sekine et al. | 396/54 |
| 5,210,559 | A * | 5/1993 | Ohki | 396/55 |
| 5,321,515 | A | 6/1994 | Kusaka et al. | |
| 5,371,539 | A * | 12/1994 | Okino et al. | 348/208.6 |
| 5,748,231 | A * | 5/1998 | Park et al. | 348/207.99 |
| 5,959,666 | A * | 9/1999 | Naganuma | 348/208.3 |
| 6,809,758 | B1 * | 10/2004 | Jones | 348/208.99 |
| 7,010,045 | B2 | 3/2006 | Lee | |
| 2003/0174772 | A1 | 9/2003 | Voronov et al. | |
| 2003/0184674 | A1 * | 10/2003 | Manico et al. | 348/375 |
| 2003/0220835 | A1 | 11/2003 | Barnes, Jr. | |
| 2004/0051793 | A1 * | 3/2004 | Tecu et al. | 348/231.99 |

FOREIGN PATENT DOCUMENTS

| | | |
|---|---|---|
| EP | 0589643 A1 | 3/1994 |
| EP | 0632649 A1 | 1/1995 |
| EP | 1117251 A1 | 7/2001 |
| JP | 06-038091 | 2/1994 |
| JP | 2000-099744 | 4/2000 |
| WO | WO0054494 A1 | 9/2000 |

OTHER PUBLICATIONS

Ting Chen, "Video Stabilization Algorithm Using a Block-Based Parametric Motion Model", Winter 2000, Stanford University, pp. 3 and 4.*
International Search Report and Written Opinion-PCT/US2005104485, International Search Authority-European Patent Office-Feb. 26, 2007.
Supplementary European Search Report-EP05713427, Search Authority-Munich Patent Office, Jun. 2, 2010.
Engelsberg et al (1999). "A comparative review of digital image stabilizing algorithms for mobile video communications". IEEE Trans. On Consumer Electronics, vol. 45, No. 3. pp. 591-597.

* cited by examiner

Primary Examiner—Sinh Tran
Assistant Examiner—Anthony J Daniels (57) ABSTRACT

A method and apparatus for image stabilization takes an input image sequence including a plurality of frames, estimates frame-level motion vectors for each frame, and adaptively integrates the motion vectors to produce, for each frame, a motion vector to be used for image stabilization. A copy of the reference image of a frame is displaced by the corresponding adaptively integrated motion vector. In one embodiment, the perimeter of the image sensor is padded with a margin to be used for image compensation. In another embodiment, vertical and horizontal components are treated independently. In still another embodiment, the motion estimation circuitry associated with an MPEG-4 encoder is used to calculate macroblock level vectors, and a histogram is used to compute a corresponding frame-level vector for that frame.

27 Claims, 4 Drawing Sheets

ADAPTIVE IMAGE STABILIZATION

BACKGROUND

1. Field

The present invention relates to video technology, and more specifically to video image stabilization.

2. Background

The integration of camera and video functionality into mobile phones, personal digital assistants (PDAs) and other handheld devices has become mainstream in today's consumer electronic marketplace. This present capability to add imaging circuits to these handheld devices is attributable, in part, to the availability of advanced compression techniques such as MPEG-4. Using MPEG or another appropriate compression scheme, video clips can be taken by the camera and transmitted wirelessly to other devices.

The transmission of the video may take place in real time or non-real time. Video e-mail is one increasingly popular non-real time technique used in several markets around the world. Using video e-mail, an individual can use a handheld device to take a video or multimedia clip, compress and record the video, and then transmit a compressed version of that clip together with an appended audio or video message to another computing device (such as a PC or another handheld device). The receiving device, in turn, can record the clip, or decode and reproduce the clip on a display. Real time imaging techniques are also in development. As processors become faster, compression techniques superior, and wireless bandwidths larger, video telephony in real time using handheld devices will likely enjoy an ever-increasing marketplace presence.

Camera or image shake represents an issue characteristic of any video imaging system. Camera shake is unintended movement of the video camera device by the user that, if not compensated for, appears in the rendered image sequence. Camera shake often includes small, jerky, and alternating types of movements. Camera shake should be distinguished from normal, intended motion of the camera associated with scene scanning by a videographer. More often than not, camera shake contributes nothing to the rendering of a scene. Instead, the shake can compromise the quality of the video and, more than anything, is annoying to the viewer. While the problem is universally applicable to free-moving video cameras, the adverse effects associated with image shake are only exacerbated in lighter and smaller devices such as mobile phones or the like.

Certain techniques have been proposed or implemented to reduce or eliminate camera shake. For example, image stabilization circuit techniques are often used in camcorders to help remove unwanted "shake" associated with jerky and unintended movements of the camera by the individual shooting the image sequence. Conventional techniques involve studying the motion of the video frames relative to one another, quantifying this motion using frame-level motion vectors, integrating these vectors together, enlarging and cropping the image, and using the integrated vector information to "reposition" frames of the image to produce a more smoother image sequence.

For a growing body of applications, the present method is no longer adequate. The need for more effective yet inexpensive image stabilization techniques has dramatically increased by factors such as (i) the marketplace demand for smaller and smaller cameras and video recorders, and (ii) the incorporation into various handheld devices (e.g., mobile phones, personal digital assistants, GPS receivers, etc.) of camera and video functionality. As the electronic devices become smaller in form factor, they unfortunately permit grip capability that is less "user friendly" than more conventional or specially-designed grips such as those found on heavier or more stable models, or on over-the-shoulder video cameras. Further, as handheld devices become lighter, it is more difficult for the user to shoot images that are free of discernable shaking of the hand or other unintended user movements, which movements become incorporated into the image. Additionally, small handheld devices have little room for the incorporation of additional cumbersome circuitry dedicated exclusively to image stabilization. Cost also becomes an important issue in these handheld devices.

The traditional methods have shortcomings, particularly when proposed for use in handheld devices. One problem with the traditional method used in camcorder applications is that it often cannot distinguish natural, intended motion associated with scene scanning or moving objects on one hand, from undesirable and unintended motion associated with camera shake on the other hand. As a result, the device may attempt to compensate for motion that is a natural and desired part of the scene being recorded, resulting in inaccuracies and visually unpleasant artifacts at the output. As noted above, the problem is exacerbated in the case of a light weight hand held device, where unstable motion or shake is typically more discernable.

As a consequence of the various shortcomings that persist with conventional stabilization systems, the rendered video image can be significantly compromised or even corrupt. For example, image shake tends to induce motion blur in the final rendered image sequence even when the image stabilization function is engaged. Further, if the area being scanned lacks sufficient contrasting detail for the stabilizer to "lock onto", the stabilizer can hunt, oscillate or bounce. These errors are only magnified in the output video sequence. Another common problem is that, as mentioned above, the stabilization system often cannot discern whether the movement of the object or camera is natural, intended movement, or camera shake. In this case, when the user commences a slow pan or tilt, the stabilizer may erroneously predict the commencement of this movement to be camera shake and proceed to compensate for it. The result is an unstable or inaccurate output image sequence.

Accordingly, a need exists in the art to remove unstable motions in video handheld and other devices while preserving natural motion such as scene scanning, with a minimal requirement of additional dedicated circuitry and a minimal increase in computational complexity.

SUMMARY

In one aspect of the present invention, a method of stabilizing an image comprising a plurality of sequential frames, including estimating a plurality of motion vectors, each motion vector corresponding to one of the frames, adaptively integrating each of the motion vectors with the motion vectors corresponding to the previous frames and using the adaptively integrated motion vectors to compensate the frames to stabilize the image.

In another aspect, a method for image stabilization of an image sequence including n frames includes storing each frame from an image sensor into a reference buffer, estimating a frame-level motion vector $V(n)$ for each of the n frames, generating adaptively integrated motion vectors $F(n)$ for each of the n frames based on $V(n)$ and a motion vector $F(n-1)$ corresponding to the previous n−1 frames, and rendering each of the n frames as a video sequence by displacing, when necessary, the nth frame in the reference buffer by $F(n)$.

In yet another aspect of the invention, an image stabilization apparatus for use in a device capable of capturing video includes an image sensor for capturing video frames comprising an image sequence, a buffer coupled to the image sensor for storing a reference image associated with a captured frame, a motion estimation circuit coupled to the buffer and operative to compute a motion vector for each frame, an adaptive integration circuit coupled to the motion estimation circuit and operative to adaptively integrate the motion vectors associated with each frame to output a cumulative motion vector for each frame, and a rendering circuit coupled to the buffer and the adaptive integration circuit and operative to copy a stabilized portion of the image sequence.

In still another aspect of the invention, an image stabilization circuit includes means to estimate a plurality of frame-level motion vectors corresponding respectively to a plurality of frames comprising an image sequence, means to adaptively integrate each of the plurality of frame-level motion vectors to produce a corresponding motion vector for use in image stabilization, and means to render each frame using, where necessary, the corresponding motion vector for use in image stabilization.

It is understood that other embodiments of the present invention will become readily apparent to those skilled in the art from the following detailed description, wherein it is shown and described only several embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

While the present invention is described in the context of handheld electronic devices, it should be understood that the invention has application to other types of devices, including video cameras, movie cameras, camcorders, and virtually any type of electronic devices which incorporates a video camera.

Consumer demand for handheld devices that incorporate greater and more sophisticated functionality has soared in recent years. Recently introduced en masse to the consumer marketplace are handheld devices such as mobile phones and personal digital assistants (PDAs,), etc., that incorporate video capturing and transmission technology, i.e., video cameras. The ability for designers to address the demand for handheld devices that incorporate video with other functions is attributable to various factors. One factor is the availability of faster and functionally superior microprocessors and digital signal processors. Another is the decrease in form factor (size) of today's semiconductor chips and associated components such as circuit boards and batteries. Still another relates to overall design improvements in the handheld units and cameras themselves. For instance, today's single chip high resolution color sensor camera modules are inexpensive and very compact.

Yet another factor is the availability of advanced compression techniques—such as MPEG-4, for example—that enable a handheld device to receive, compress, store, display and transmit to other devices the large amounts of video or multimedia information associated with capturing images using a video camera. These techniques are discussed further below.

Regardless of the application, whether real time video telephony or video conferencing, video e-mail or messaging, video streaming, or otherwise, a real time video encoder may be used in the handheld device to compress the video data stream produced by the integrated camera module as the video stream is captured.

MPEG-4 is an ISO/IEC compression standard developed by MPEG (Moving Picture Experts Group). MPEG-4 is a new video compression standard providing core technologies for the efficient storage, transmission and manipulation of video data in multimedia environments. MPEG-4 is the result of an international effort involving hundreds of researchers and engineers worldwide. The focus of MPEG-4 was to develop a standard that achieves, among other things, highly scalable and flexible algorithms and bitstream configurations for video coding, high error resilience and recovery over wireless channels, and highly network-independent accessibility. For example, with MPEG-4 coding it is possible to achieve good picture quality in some applications using less than a 32 kbit/s data rate.

MPEG-4 builds on the success of its predecessor technologies (MPEG-1 and MPEG-2), and provides a set of standardized elements to implement technologies such as digital television, interactive graphics applications, and interactive multimedia, among others. Due to its robustness, high quality, and low bit rate, MPEG-4 has been implemented in wireless phones, PDAs, digital cameras, internet web pages, and other applications. The wide range of tools for the MPEG-4 video standard allow the encoding, decoding, and representation of natural video, still images, and synthetic graphics objects. Undoubtedly, the implementation of future compression schemes providing even greater flexibility and more robust imaging is imminent.

Generally, the compression principles of MPEG and similar standards are premised on the realization that it is not necessary for the transmitting device to send information describing each and every pixel for each frame of video. Such a technique would consume an unacceptable amount of bandwidth and/or result in the transmission of video having an unacceptably low resolution. Instead, MPEG compression techniques generally operate under the principle that after an "initial" frame is transmitted, then for a certain period only changes from one frame to another need be transmitted. Thus, for example, in a video scene in which an individual is in the foreground and the background is dark blue and stays dark blue for a period of time, MPEG relies on the principle that it is not necessary to expend bandwidth by retransmitting information representing the dark blue background for each frame. Instead, an MPEG decoder can predict and render subsequent frames by considering the displacement, or motion, of one frame relative to another.

As an illustration, MPEG and related compression techniques may use an encoder for storing sequences beginning with a full frame of image information, and for encoding subsequent frames using information describing only the changes to (including the relative motion of objects in) the initial frame. That way, the entire per-pixel image of every frame that would otherwise occupy unacceptable bandwidths need not be stored. The receiving device or display uses a decoder to decompress the image information and render the image sequence. The decoder reproduces the initial frame of the sequence, and then renders subsequent frames by interpreting the associated per-frame motion information. In some instances, frames are reproduced using motion information that is dependent not only on a previous frame, but also on a subsequent frame. Compression ratios of 40:1 or greater can often be obtained using these techniques.

MPEG-4 is a motion estimation algorithm. Motion estimation algorithms calculate the motion between successive video frames and predict the information constituting the current frame using the calculated motion information from previously transmitted frames. In the MPEG coding scheme, blocks of pixels of a frame are correlated to areas of the previous frame, and only the differences between blocks and their correlated areas are encoded and stored. The translation vector between a block and the area that most closely matches it is called a motion vector.

Stated differently, video compression standards like MPEG-4 predict the image data from the previous frame using a displacement vector estimation. The displacement vectors constitute mathematical representations of the direction and magnitude of motion that takes place during a video sequence. To increase coding efficiency, each frame of an image sequence may be "broken down" into a series of blocks (8 by 8 pixels) or macroblocks (16 by 16 pixels), and motion vectors are thereby calculated for each of those blocks. In an embodiment using MPEG-4, associated with each block or macroblock is a set of motion vectors, certain block level data, and a macroblock address identifying the position of the macroblock relative to the image sensor. As an illustration, when transmitting the compressed video, after one or more initial frames are transmitted, the motion vectors of subsequent frames are transmitted instead of transmitting the entire matrix of per-pixel information associated with the next group of frames. The process may repeat itself for subsequent groups of frames.

When capturing video, motion vectors are generated by camera motion and by object motion (e.g., the individual in the foreground in the above example). In the encoding process, blocks of pixels of a frame are correlated to areas of the previous frame, and only differences between blocks and their correlated areas are encoded. At the receiving end (whether remote or on-camera), the MPEG-4 decoder reconstructs the image by rendering the initial frame for each group of frames and then rendering the subsequent frames for each group by using the motion vector information contained in the block or macroblock level vectors. Following the group of frames, a new frame may be transmitted in its entirety. In certain instances, a frame is rendered by using motion vectors from both previous frames and subsequent frames. As will be seen, motion estimation plays a pivotal role in digital and electronic stabilization systems.

In an MPEG-4 application involving a videophone (real time) or video e-mail (non-real time), a handheld device may use both an MPEG-4 encoder to compress the video information obtained from the CCD or CMOS image sensor, and an MPEG-4 decoder to decompress received video for rendering on a display.

Motion Stabilization

A stabilization technique according to the present invention removes unstable motions in image sequences while preserving the natural motion of video—namely, intended camera motion (such as scene scanning) and object motion (i.e., the objects in the captured video). The stabilization technique may, depending on the embodiment, be performed exclusively in: hardware (e.g., one or more DSPs, a dedicated microcontroller, ASICs, or other application specific circuit devices or techniques); a combination of hardware and software; or exclusively in software (i.e., the stabilization may be performed by the handheld device's CPU). However, in a device such as a mobile phone, the processor is not as powerful due in part to power consumption limitations in a battery-operated device, as well as the price premium problems associated with incorporating more sophisticated CPUs. As such, in many devices the motion estimation circuitry may be implemented in discreet hardware, minimizing the load on the handheld's processor.

In one embodiment, the motion estimation circuitry associated with estimating the motion vectors and compressing the video stream is also used as part of the stabilization circuitry. Because motion estimation (such as that used in MPEG-4) is a computationally expensive process, and because image stabilization also uses motion estimation (see below), the use of motion estimation circuitry to stabilize the image results in a very efficient use of processor resources.

Figure 1:
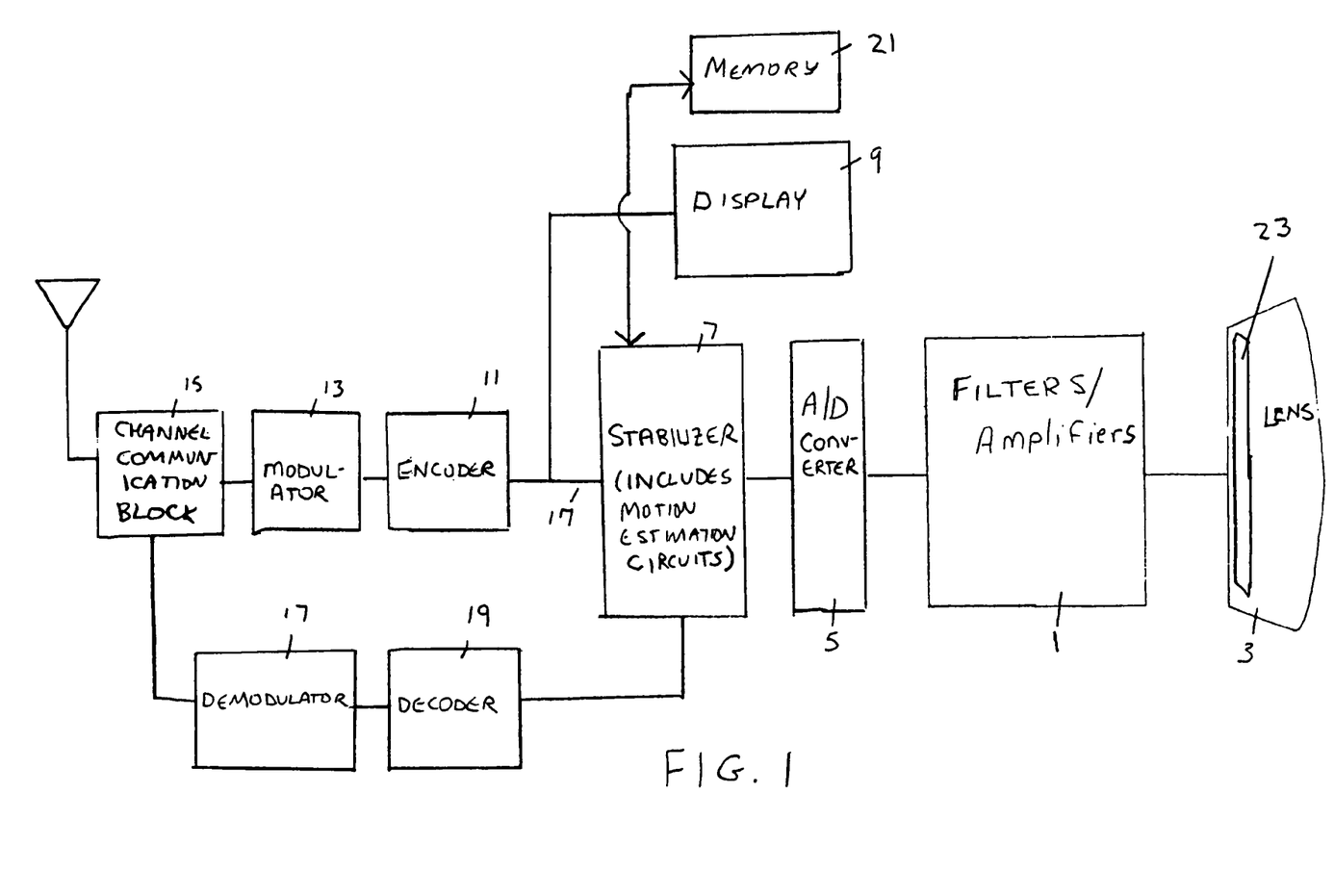
FIG. 1 is a block diagram of a handheld device incorporating an image stabilizer according to an embodiment of the present invention.

A block diagram of the components of a handheld device using a stabilizer in accordance with the present invention is shown in FIG. 1. A lens 3 includes an image sensor 23, such as a rectangular matrix of charged-coupled devices (CCDs) or CMOS devices that form a flat surface and act as a receptacle for light containing the video information. The image sensor 23 collects video data constituting raw frames of images. The data is fed through various circuits for processing, including filters and amplifiers 1 and analog to digital converter 5. (The types and quantities of circuits may vary depending on the specific camera and the configuration). The digital information representing the frames is then sent to the stabilizer 7. In this embodiment, the stabilizer includes, among other components, motion estimation circuitry used to calculate block-level motion vectors for use in compressing the video signal. While the example herein is presented in the context of MPEG-4, other compression schemes may be contemplated as within the scope of the invention.

At the output 17 of stabilizer 7 resides digital image data. In this example, the data may have been compressed by the compression circuitry within stabilizer 7 for storage in a memory device 21, such as flash memory or an internal frame buffer, or it may be transmitted to another device, such as in a video telephone or video e-mail application. For simplicity of the example, it is assumed that the data at output 17 can be either compressed or, when the application so mandates, the data can be in its raw, uncompressed form. It is also assumed that the compression functionality resides within the stabilizer so that the output 17 of stabilizer 7 may include either compressed data (for transmission or storage) or raw, uncompressed data for immediate viewing on a display. (In other embodiments, the data may be compressed prior to being transmitted to the display, where appropriate circuitry (not shown) decompresses the data and reconstructs the image sequence). Further, in some embodiments, the frame data may be immediately transferred to the frame buffer, and then sent back to the stabilizer and motion estimator for compression or further processing. The compression mechanism in this case is assumed to be part of the stabilizer in part because the computationally-intensive motion estimation circuitry is used both for image compression and stabilization of camera shake.

The compressed data is then encoded by encoder 11 and modulated by modulator 13 into a format appropriate for transmission over the intended medium. The encoder 11 here refers not to the MPEG-4 encoder, but rather to a data encoder that exists in this embodiment. After being modulated onto an appropriate carrier signal for wireless transmission, the data is then transmitted via the channel communication circuitry 15.

The handheld device may also receive compressed MPEG data through channel communication block 15. The received data is demodulated and decoded by demodulator 17 and decoder 19, respectively. The data may be decompressed by stabilizer 7 and reproduced on display 9, or it may be stored in memory 21 for future use.

In this embodiment, the motion estimation circuitry (embedded in this example in stabilizer 7) may be used for two purposes. First, it is used to calculate the block or macroblock level motion vectors for MPEG compression. Second, the vectors computed from the motion stabilization circuitry are used to estimate the global (frame-level) vectors that will be used in the stabilization process described below. As a result of this integration of the motion estimation circuitry for use in two discrete functions, considerable space is saved and independent computational circuits for stabilizer-specific motion estimation are not required. This configuration results in the saving of valuable real estate on handheld devices where space is scarce. In addition, computational complexity is minimized, thereby increasing performance without sacrificing excessive battery consumption. It should be noted, however, that the use of this motion estimation circuitry for both purposes, while beneficial in the context of MPEG-4 and certain other devices, is not essential to the practice of the invention.

Conventional digital image stabilization may correct camera shake in different ways. In one embodiment, as the shaky image proceeds through the lens and strikes the image sensor of the handheld device, the image stabilization system repositions the active area of the image sensor chip—i.e., the physical location on the chip that the image is read from—to compensate for the shake. This "repositioning" step is performed by re-addressing the area of the chip that the system is reading from. Each pixel in one embodiment is associated with a unique binary address. Pixel information associated with addresses that are not part of the repositioned image are simply ignored. The stabilizer 7 estimates the global (frame-level) motion vectors in the image based on the block-level and/or macroblock level vectors computed from the MPEG compression step, in a manner to be discussed further below.

As will be seen, the actual repositioning is performed in one of two ways. The first, and conventional, technique is to enlarge (zoom) the image digitally so that the full raster of the image sensor chip in lens 3 isn't used. Stated differently, the image is cropped from a portion of the area of the image sensor, leaving a margin of "unused pixel area" around the perimeter of the image sensor. The stabilizer can the pan within the full ship raster to catch the image as it moves about. Zooming and cropping the image leaves a "margin of error" in which the camera's stabilization system can compensate for camera shake.

The second method for repositioning the active area of the sensor chip results in the effect, namely, to provide a margin to compensate for camera shake. This method uses an oversized image sensor or CCD matrix, so that unused borders exist for the active area to be moved around in without first zooming the image. In one embodiment, an 8 pixel margin is padded from the perimeter of the image sensor for this purpose, as will be discussed further below. This unused margin is used to provide an area for compensation for image shake, as in the method above. Using this method, however, the time-consuming processes of digitally zooming and cropping the image are eliminated. This latter method is particularly beneficial in the context of real time video, because steps otherwise necessary to eliminate camera shake become unnecessary. Either method, or another method for providing a margin, may be implemented pursuant to the invention.

Figure 2:
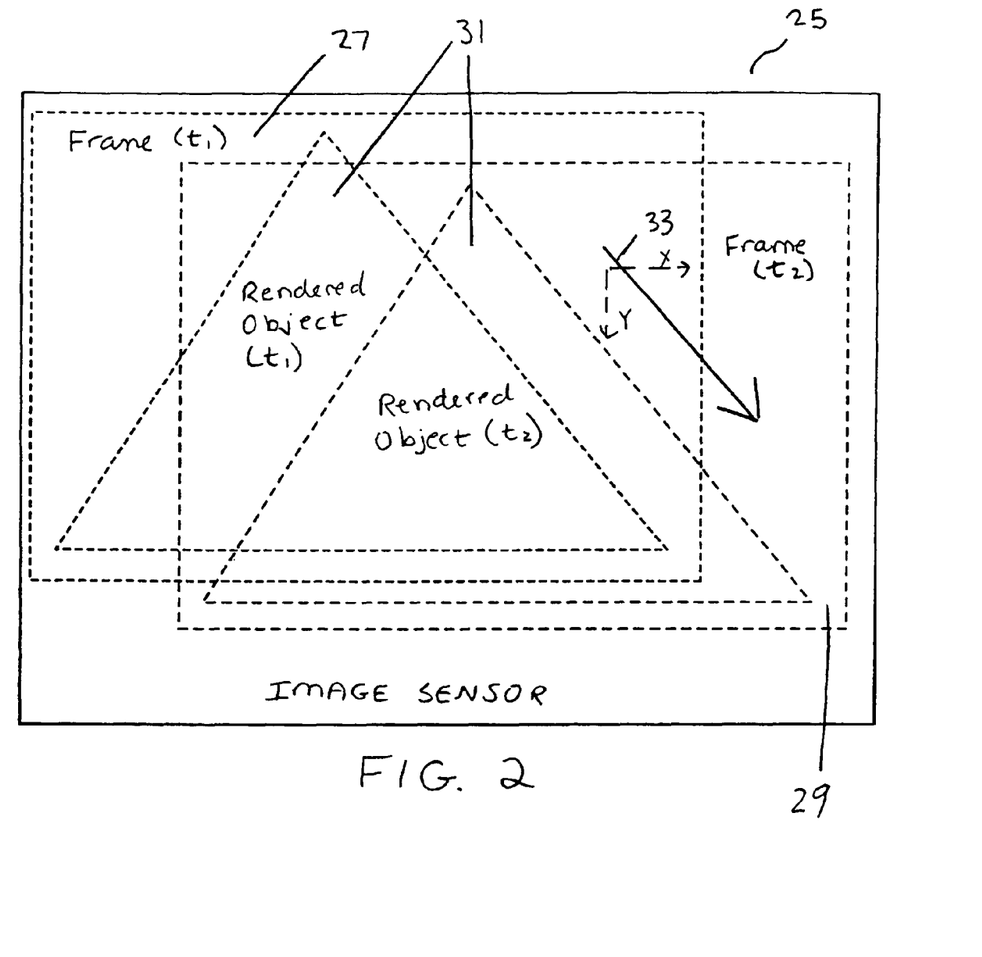
FIG. 2 is a drawing of an exemplary image sensor with moving frames.

FIG. 2 is an illustration of an imaging area of a video camera, such as that integrated into a handheld device. Rectangle 25 represents the area corresponding to the image sensor of the camera, such as a CCD sensor. The image sensor is a semiconductor chip commonly composed of a matrix of CMOS or CCD elements which records light falling on it and captures the picture. A charge-coupled device (CCD) is a light-sensitive integrated circuit that stores and displays the data for an image in such a way that each pixel in the image is converted into an electric charge, the intensity of which is related to a color in the color spectrum.

Rectangles 27 and 29 represent frames within the image sensor 25 captured by the video camera at two different times t1 and t2. In one embodiment, each frame can be recorded by the camera by assigning a unique address to each CCD element, so that only the outputs of a particular matrix of CCD addresses are considered and the remainder discarded. In FIG. 2, it is assumed for illustrative purposes that the frames 27 (captured at time t1) and 29 (captured at time t2) are displaced relative to each other by a specific magnitude and direction as a result of camera shake. Triangles 31 represent an object that is part of the scene being recorded. Triangle 31 appears in two locations, one within each image 27 and 29. The triangle 31 is displaced from frame 27 to frame 29 within imaging area 25; however, the triangles are not displaced relative to their corresponding frames 27 and 29. That is, the triangle is stationary in the scene being captured; it does not move relative to the remainder of the frame. In this illustration, only the video camera is moved.

As FIG. 2 illustrates, camera shake is a time-relevant concept that refers to random or unsystematic motion on a frame-level basis. The difference between frames 27 and 29 can be represented by a global displacement or a global motion vector. This global motion vector is a frame-level motion vector, meaning that the vector contains information about the magnitude and direction of the displacement of the entire frame 29 relative to the entire frame 27. This displacement vector 33, representing the effective difference between frames 27 and 29, can be further broken down into x and y components. The x component represents the magnitude of displacement of frame 29 relative to frame 27 in the horizontal direction, and the y component represents the magnitude of displacement of frames 29 relative to frame 27 in the vertical direction. Accordingly, the total frame-level displacement vector 33 is the sum of a discrete frame-level displacement in the x (horizontal) direction and a discrete frame-level displacement in the y (vertical) direction.

Note that even if there was a displacement of triangle 31 relative to one or both if its respective frames 27 or 29, the measurement of camera shake can still be represented by a frame level vector displacement analysis. The movement of triangle 31 in this case would simply represent the natural motion of an object in the captured video scene, and would not effect the magnitude or direction of the frame-level displacement vector 33 for representing camera shake.

As previously discussed, compression techniques like MPEG-4 estimate motion for high coding efficiency on a block (8×8 pixel) or macroblock (16×16 pixel) basis. In contrast, image stabilization techniques consider a widespread displacement of the image as a whole. For this reason, in an embodiment where MPEG compression techniques are used, the results from the block/macroblock level displacement vectors estimated in the compression process may be used to estimate the total frame level displacement vector 33 for successive frames of video. In contrast, where another compression scheme is used that generates frame-level displacement vectors or where dedicated circuitry is used to generate frame-level vectors, this block to frame level conversion needn't take place.

As noted above, image stabilization circuits have been developed and integrated into many consumer camcorders. Motion stabilization is generally an option which can be engaged or disengaged by the user by means of a switch or option on an electronic panel. The image stabilization mechanisms of those systems generally involve four steps: (i) for each frame of video, the stabilizer estimates the immediate global (frame-level) motion vector of the frame by comparing it to previous video frames; (ii) the stabilizer performs a mathematical integration of this estimated motion vectors with the past set of estimated motion vectors, thereby obtaining a "smooth" estimation of the motion vector; and (iii) the stabilizer crops and enlarges (digitally zooms) the image in accordance with the magnitude and direction of the global motion vector; and (iv) the system repositions the cropped image on the image sensor such that the cropped image sequence appears to be stable.

This method may suffice in some instances for camcorder applications. The camcorder use may induce less camera shake due to the greater stability and heavier weight of the camcorder. Hence, most movement associated with the camera is intended movement. The effects of jerky movement associated with camera shake are attenuated by virtue of the integration step. In that step, a "weighted addition" of the motion vectors is effectively performed, such that isolated jerky movements are not as pronounced at the output. However, this method is not optimal. The integration step may "smooth out" jerky movement, but it is not capable of precisely distinguishing between natural camera or object movement at one end of the spectrum, and pure camera shake at the other. This shortcoming, however, is typically less noticeable (although still problematic) in camcorders given the relatively high magnitude of intended or normal motion versus unintended movement and the increased perception of smoothness via the integration step.

Particularly where smaller handheld devices like mobile phones or PDAs are involved, the conventional method discussed above falls short. For example, the handheld device is lighter and lacks grips designed specifically for stable video shooting. Thus, a large amount of camera shake may be induced relative to the amount of natural or intended movement. With its undiscriminating integration steps and its zooming and cropping, the conventional method may take up an excessive amount of space or may consume more power than the handheld device can efficiently provide. Moreover, the conventional method's stabilization of the image through a simple mathematical integration technique produces much more noticeable error for smaller, handheld devices. The use of simple integration, which amounts to nothing more than a weighted addition of the estimated displacement vectors, is insufficient to differentiate natural camera or object movement from undesirable camera shake.

As a result, the present invention introduces a technique for adaptive integration which overcomes the shortcomings associated with the conventional method of image stabilization. It should be noted that, while the present embodiment of the invention is discussed in the context of a handheld device, the algorithm may be used in other devices to improve image stabilization quality without departing from the scope of the invention.

Figure 3:
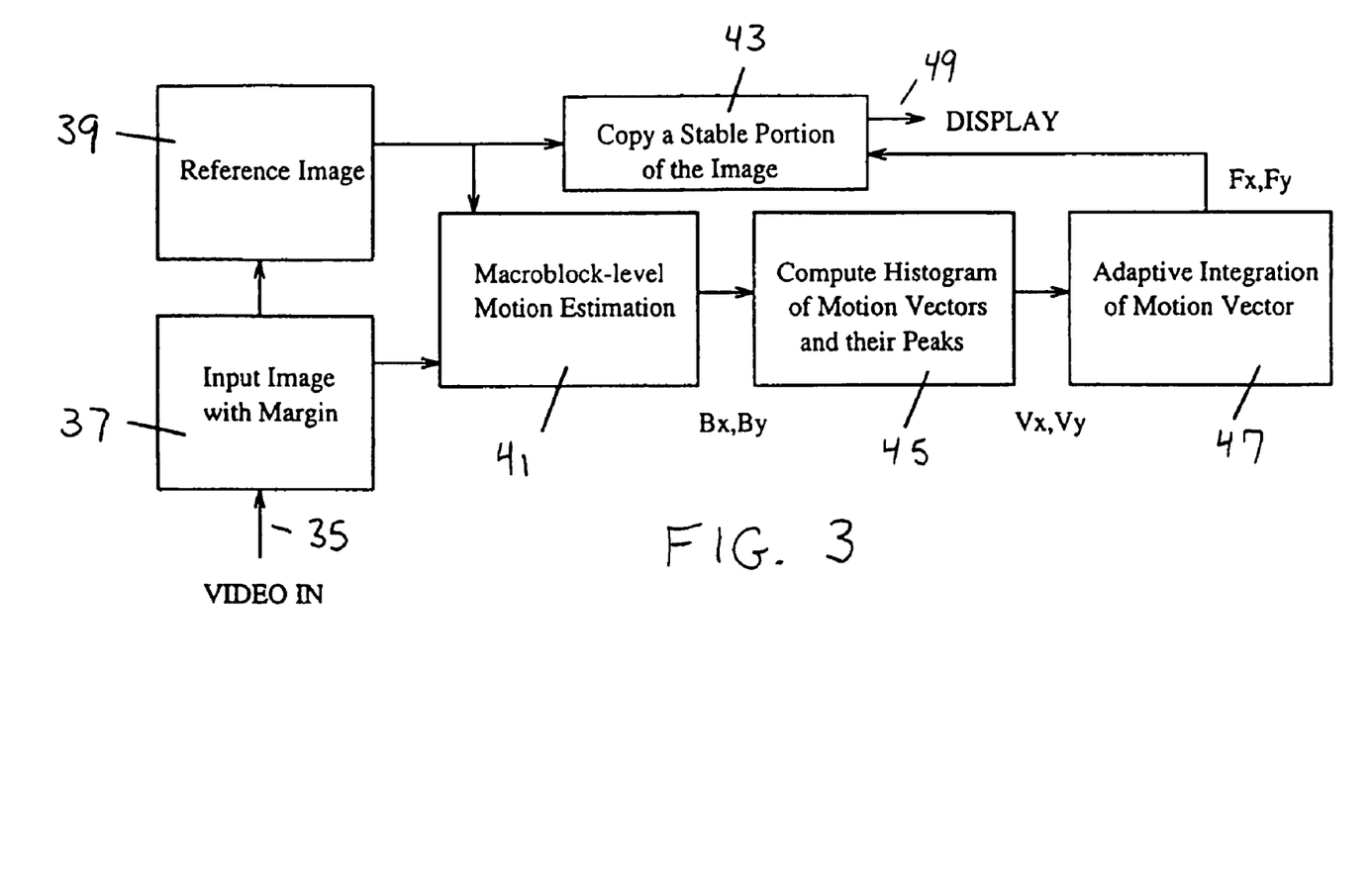
FIG. 3 is a functional diagram of the image stabilization method according to an embodiment of the present invention.

Shown in FIG. 3 is a block diagram of an adaptive image stabilization algorithm in accordance with an embodiment of the present invention. A video signal VIDEO IN is received at input 35. The video signal may be in a variety of different types of formats. At step 37, the image is padded around its perimeter with an additional zone of pixels. In one embodiment, a margin of 8 pixels thick is padded around the image. The 8-pixel margin is to be used to provide an area to compensate for camera shake. Padding the image with a pixel margin as in this embodiment instead of enlarging and cropping the image minimizes computational complexity and delay associated with performing these extra computations. While the enlarging and cropping method can also be performed in an alternative embodiment, the padding method of step 37 is especially suitable for handheld devices because less circuitry and processing power is required—namely, no digital zooming or cropping computations need be part of the stabilization process in this embodiment.

At step 39, a copy of the reference image representing the presently-captured frame is stored in a reference frame buffer (such as memory 21 in the video camera of FIG. 1) for subsequent rendering. At step 41, the motion estimation circuitry associated with the MPEG compression mechanism estimates a set of macroblock level displacement or motion vectors $B_x$ and $B_y$ for the frame input at step 37. As noted, motion vectors in MPEG carry the displacement of the current macroblock with respect to a previous reference frame. In this way, the image data may be compressed for efficiency, and the current frame may be reconstructed by using the earlier reference frame together with the motion vector information. In this embodiment, the calculations associated with step 41 are used both for the stabilization algorithm and the video compression algorithm. The use of the same circuitry to perform both functions has considerable ramifications for smaller devices. Using the results of compression in the image stabilization step saves considerable real estate by obviating the need for additional dedicated circuitry, preserving the small size of the handheld device. Additionally, less computation is required, which avoids taxing the CPU or dedicated hardware with extra steps already performed in the compression circuitry.

Accordingly, at the output of block 41 in this embodiment are two sets of macro-block level vectors: vectors representing macroblock displacement in the x direction, and vectors representing macroblock displacement in the y direction. In addition to their use in image stabilization as shown in FIG. 3, these vectors are used by the MPEG encoder (not shown) in the compression algorithm.

For the purposes of image stabilization, the macroblock-level motion vectors $B_x$ and $B_y$ need to be converted into a global or frame-level motion vector which represents the relative displacement of the present frame with previous frames. As illustrated in connection with FIG. 2, camera stabilization algorithms consider the frame-level displacement of the image, rather than the block level or pixel level motion. This conversion step is performed at step 45. Step 45 uses the input macroblock-level motion vectors $B_x$ and $B_y$ to produce a set of global motion vectors $V_x$ and $V_y$ associated with the displacement of the entire frame (rather than blocks or portions thereof) relative to earlier frames.

In one embodiment, the frame-level motion vector set ($V_x$ and $V_y$) for the current frame is computed in step 45 from the histogram of the macroblock-level motion vectors. That is, histograms of the macroblock-level motion vectors and their peaks are computed. The purpose of a histogram is to mathematically summarize the distribution of a data set. The histogram indicates the distributions of relative motions and their magnitudes with respect to the area on a frame to which each macroblock correlates. The histogram is used, in this instance, to identify the common components of all the macroblock-level motion vectors. Common components of macroblock level motion reflect frame-level displacement, rather than, for example, random displacement of objects in the scene. Once these common components are identified, the frame-level motion vector can be estimated. For example, assume that the horizontal and vertical histograms of macroblock-level motion vectors $B_x$ and $B_y$ are $h(B_x)$ and $h(B_y)$, respectively. The frame-level motion vector ($V_x$, $V_y$) can be computed in one embodiment as follows:

$$V_x = \sup\{h(B_x) : B_x \neq 0\}$$

$$V_y = \sup\{h(B_y) : B_y \neq 0\}$$

where the term "sup" refers to the upper limit of the histogram array. It is noteworthy that at step 45, the vertical and horizontal components of motion are treated independently in this embodiment. That is, a global motion vector component associated with motion in the x (horizontal) direction is computed, and a global motion vector component associated with motion in the y (vertical) direction is also computed.

The computations in step 41 and 45 may be performed by dedicated hardware, such as ASICS, digital signal processors, PALs, or PLAs. Alternatively, one or more dedicated controllers may be used. Depending on the application, the computations may be performed in software by the CPU of the host device. In general, for smaller handheld devices, many of the functions relating to compression and image stabilization are performed by dedicated circuitry.

At step 47, the stabilizer performs an adaptive integration of the input global motion vector set ($V_x$, $V_y$). As explained further below, the global motion vector ($V_x$, $V_y$) associated with the current frame is adaptively integrated in this embodiment to the global motion vector set ($F_x$, $F_y$) created by the cumulative analysis of the motion vectors of the previous frames (i.e., earlier frames in the video image sequence that each went through the process in FIG. 3). In traditional stabilization systems, the global motion vector is simply integrated with global motion vectors of past frames to estimate a "smooth" motion vector representing average displacement of the frames in the image sequence over time. That is, the current global motion vector is traditionally added to previous vectors in a manner that accords each vector a weight of importance depending on its frequency of appearance in the image sequence. One problem with this conventional method is that no attempt is made to differentiate vectors resulting from camera shake versus vectors associated with natural motion, such as scene scanning. As underscored earlier in this specification, in embodiments involving handheld devices, the problem is made worse because weight and grip considerations generally make camera shake more pronounced.

Unlike the straight integration technique performed in the stabilizer circuitry of conventional systems, the adaptive integration technique of the present invention dramatically improves the performance of the stabilizer without the penalty of an intensive increase in computation complexity. Using the adaptive integration technique, small, alternating, random, and unsystematic motions that are generally characteristic of camera shake are fully compensated for, while consistent or systematic motions such as panning or natural object motion are properly preserved. Stated differently, the system disclosed herein paradoxically integrates the motion vectors in a manner that preserves the differentiation of movement due to camera shake and natural or intended motion. The former can thus be eliminated, resulting in superior stabilization performance in any system. Details on an embodiment of this adaptive technique are disclosed in FIG. 4, below.

Returning to the embodiment of FIG. 3, the frame-level motion vector set ($V_x$, $V_y$) are either added (as a weighted sum or using simple addition) to the set of cumulative frame level vectors ($F_x$, $F_y$) to form a new cumulative vector set ($F_x$, $F_y$), or, depending on the results of the adaptive integration technique (see below), the current vectors are disregarded and the existing cumulative vector set ($F_x$, $F_y$) remains unchanged. This adaptive algorithm can be performed in a few different ways, but the details of one such algorithm in accordance with an embodiment of the present invention are set forth in FIG. 4.

In any case, the cumulative vector set ($F_x$, $F_y$) provides information on the relative displacement of the current frame due to image shake. In essence, the cumulative vector set ($F_x$, $F_y$) provides a "correction factor" that can reposition the current frame within the padded margin such that natural movement is retained, but camera shake is substantially removed. As such, a copy of the original reference image associated with the current frame is displaced from its original, captured position by vectors $F_x$ and $F_y$, and the displaced frame 49 (within the bounds of the padded margin) is rendered on a display. The image is "re-addressed" using the $F_x$ and $F_y$ vector set. During the process in FIG. 3, frames that normally encroach into the padded margin area due to camera shake are stabilized, while the motion associated with panning and other intended movements are preserved. Meanwhile, or immediately thereafter, the next captured frame is sent into input 35 and the process repeats itself. The result is a video sequence whereby natural motion (i.e., motion of objects in the scene or motion of the camera in scene scanning) is retained while camera shake is substantially eliminated.

Each of the steps performed in FIG. 3 may be performed in dedicated hardware, or in software by the system CPU. In either event, in an embodiment where image compression is required, the calculations used to estimate motion may also be used to calculate frame-level displacement, minimizing computational complexity. It should be noted that the details of FIG. 3 are implementation specific, and they may be varied depending on the particular implementation.

An embodiment of this adaptive method is discussed in connection with FIG. 4, below. In general, the stabilizer mechanism considers the input global motion vector $(V_x, V_y)$ of the current frame and uses the information contained in those vectors to compute a frame-level vector $(F_x, F_y)$ that is representative of the history of previous frames in the image sequence. The "cumulative" frame-level vector set $F_x$ and $F_y$, estimated using an adaptive methodology is used to reposition images in the sequence, and in so doing, eliminates camera shake more effectively than existing techniques.

Figure 4:
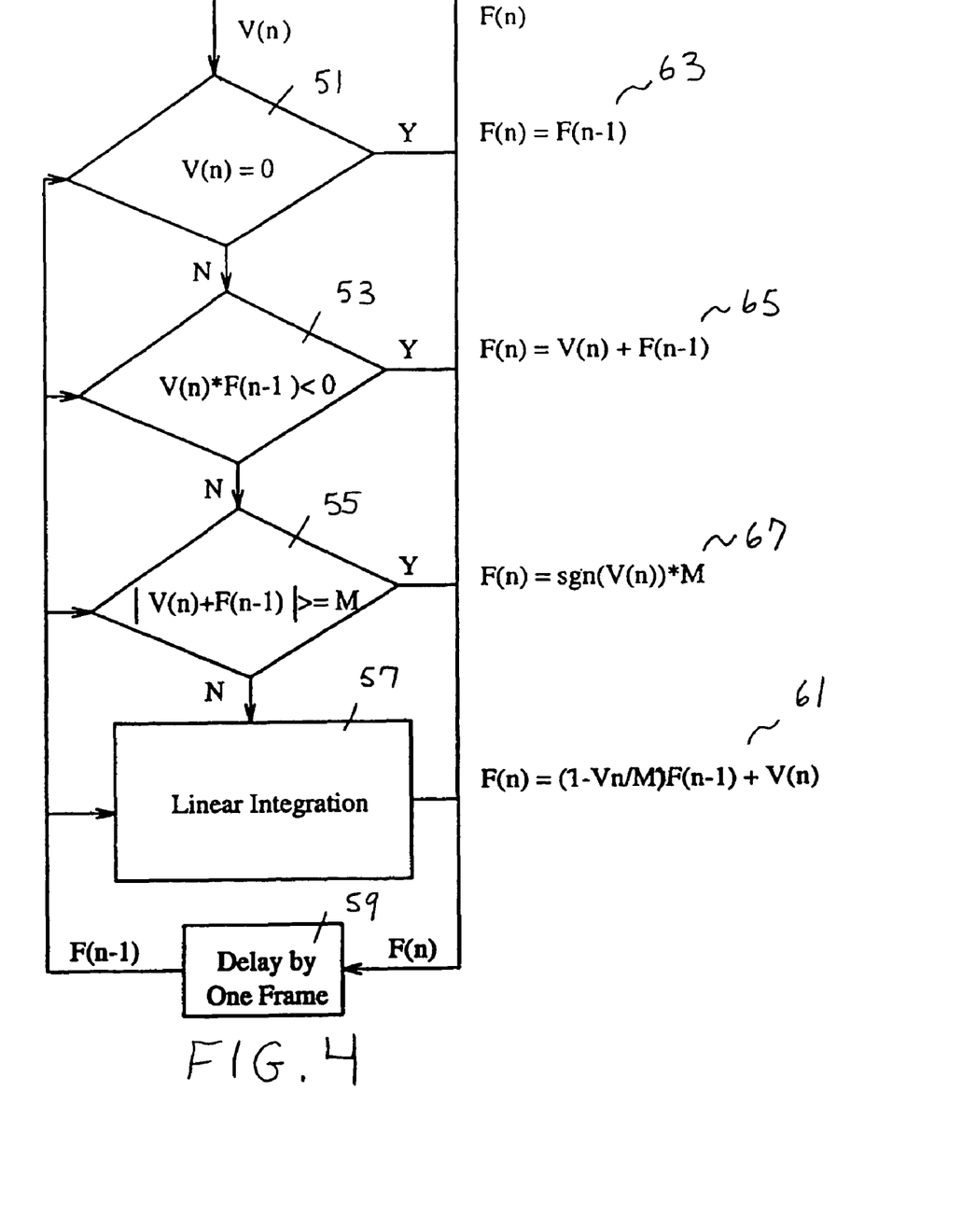
FIG. 4 is a flow chart representing adaptive integration according to an embodiment of the present invention.

FIG. 4 is a flow chart depicting an embodiment of an adaptive integration algorithm in accordance with an embodiment of the present invention. FIG. 4 represents an exemplary embodiment of the adaptive algorithm technique discussed in connection with step 47 of FIG. 3. While the specific details of the algorithm may vary without departing from the present invention, the adaptive nature of the algorithms in general is designed to compensate for movements more likely to represent shake while preserving natural movements of the scene and the camera. More specifically, the algorithm relies on certain well-grounded assumptions to determine how, if at all, to add global motion vectors for use in stabilization.

Certain nomenclature and assumptions are now discussed as a precursor to a description of the adaptive algorithm. In the embodiment of FIG. 4, the algorithm is performed with respect to both the vector components in the x (horizontal) direction and in the y (vertical) direction. As a result, straightforward addition may be used, and the need for more complex vector-based calculations involving direction is obviated in this embodiment. The letter "n" denotes the present, or nth, frame of the image sequence. V(n) is a component of the global motion vector (i.e., either $V_x$ or $V_y$) of the current frame (e.g., the information input 35 at VIDEO IN and computed from macroblock-level vectors in step 45 of FIG. 3.) F(n−1) denotes a component of the global motion vector (i.e., either $F_x$ or $F_y$) of the cumulative history of adaptively integrated frames from the first frame of the image sequence to the immediately previous frame (n−1). F(n) is a component of the global motion vector (i.e., either $F_x$ or $F_y$) of all adaptively integrated previous frames including V(n), from the first to the current. Note that because the integration technique is adaptive by design, then depending on the compression technique, the type of frame, the way the image sequences are segmented, and other factors some of which are described below, certain frames are omitted from the calculations such that F(n) is only actually affected or altered by vectors V of certain frames.

The algorithm may be performed in any suitable computer language. Alternatively, the algorithm may be implemented in hardware, such as by application-specific integrated circuits (ASICs), programmable logic devices, dedicated microcontrollers, digital gates, digital signal processors, or any combination thereof, or a combination of hardware and software. In the latter illustration, the CPU of the handheld device may in some embodiments be relegated to performing the simpler control tasks of the algorithm while dedicated hardware may perform the vector-intensive calculations.

At step 51, the method commences by determining whether the global motion vector for the current frame V(n)=0. (Recall that V(n)—which includes $V_x$ and $V_y$, treated independently in FIG. 4—represents the frame-level global motion vector calculated in FIG. 3 and associated with the present frame). A zero value typically indicates that no motion or displacement has taken place when compared with the previously captured frame. If V(n)=0, then F(n)—i.e., the global motion vector of the accumulated n frames in the image sequence—simply equals F(n−1). Stated differently, if there is no motion of the current frame relative to the previous frame, then the current frame is read out from the same position on the margin-padded image sensor as the previous frame, and no compensating displacement is necessary for that frame relative to the previous frame.

If V(n) is not equal to zero in step 51, then a global displacement of the current frame relative to the previous frame is deemed to have occurred. At step 53, the expression $$V(n)*F(n-1)<0$$

Is next used to ascertain the probable nature of this displacement. Specifically, the expression above is used to determine whether the product of the current global motion vector associated with the nth frame and the global motion vector associated with the adaptive integration of all previous frames is less than zero, indicating whether the product is positive or negative. If the product is less than zero, then the sign of the product is negative and the direction of motion of the current frame and the previous frame differs. In particular, if the product of V(n) and F(n−1)<0, then either V(n) is negative and F(n−1) is positive, or alternatively, V(n) is positive and F(n−1) is negative. In either case, the direction of motion of v(n) is opposite to the direction of motion of the previous (cumulative) frame F(n−1). Where the direction of motion of the current frame is opposite to that of the previous frame, (i.e. V(n)*F(n−1)<0), then the two motion vectors are added together. That is, the current frame is simply added to the previous weighted frame:

$$F(n)=V(n)+F(n-1)$$

Where, as in this case, the direction of the current and previous global motion vector is opposite, the assumption is made that the past vectors need be taken into account. The algorithm in this embodiment assumes that the motion is attributable to camera shake. Camera shake is often manifested by up and down or alternating jerky movements as the videographer tries to maintain a steady grip on the handheld device. For example, if the camera moved four pixels to the left, and thereafter four pixels to the right in capturing a scene, the motion vector for stabilization as a result of this movement should be null so that the captured image sequence is stable. Performing a direct addition in this instance performs this function. It should be noted that this test may be performed for vectors in both x and y directions, and in the disclosed embodiment the two directions are treated separately.

Alternatively, where the motion associated with the current and previous vector is in the same direction—namely, V(n)*F(n−1)>0 in step 53—then the control flow proceeds to step 5. At this point, it must be determined whether the motion V(n) is attributable to camera shake versus natural camera or object motion. First, at step 55, it is determined whether the absolute value of the sum of the motions of the current and previous vectors exceeds the padded margin M, which in one embodiment=8. Specifically:

$$Is\ |V(n)+F(n-1)|\geq M?$$

If the answer to the above inquiry is yes, meaning if the current and previous motion vectors are in the same direction and the sum of their collective motion meets or exceeds the margin, then a second assumption is made. The adaptive algorithm of this embodiment assumes that the camera is scene scanning because of the relatively large and consistent motion. That is, the algorithm takes advantage of the likelihood that a motion of such a large magnitude is an intended motion, rather than a product of camera shake. In this case, the previous motion vectors do not need to be considered, and no integration is performed. Instead, the margin is used as the new motion vector F(n) for stabilization with the sign (direction) of the vector V(n) of the current frame. Mathematically, this is expressed as $$F(n) = \text{sgn}(V(n)) \times M$$

In the above situation, the margin is used as the new motion vector due to the limitations of the camera. That is, the image sensor cannot capture video beyond the margin of the camera. Other algorithms may use different embodiments to address this limitation.

If, alternatively, the current and previous motion vectors are in the same direction and their sum does not exceed the margin M, then the linear integration step of block 57 is performed. The motion vector F(n) for stabilization is computed as a weighted sum of current and previous motion vectors, where the weight is a linear function of the magnitude of the current motion vector. In this embodiment, the operative assumption is as follows: (i) it is unclear as a general matter whether the global motion vector V(n) in this case is associated with camera shake or instead is natural and intended motion, (ii) the larger the magnitude of the current motion V(n), the less likely the motion is due to camera shake and hence less weight should be attributed to the previous motion vector F(n−1), and (iii) the smaller the magnitude of the current motion V(n), the more likely the motion is due to camera shake and hence more weight should be attributed to the previous motion vector F(n−1). In one embodiment, the mathematical expression that incorporates this set of assumptions is:

$$F(n) = [(1 - V(n)/M) \times F(n-1)] + V(n)$$

Hence, as V(n) increases, the equation approaches:

$$F(n) = V(n)$$

This relationship signifies that more weight is given to the current displacement, meaning that the motion is assumed to relate more to natural or intended motion. At the other end of the spectrum, as V(n) decreases, the effect of F(n−1) becomes more pronounced, and the equation approaches:

$$F(n) = V(n) + F(n-1)$$

This relationship, which is identical to the equation produced above at step 53, signifies that the displacement is more likely due to camera shake. Accordingly, more weight is given to the addition of V(n) to the previous global motion vector for canceling small or alternating movements characteristic of camera shake.

Between the two extremes, where the nature of the displacement is unclear, F(n) is given an intermediate value as per equation 61 in FIG. 4.

Block 59 indicates that, in the embodiment shown in FIG. 4, there is a single frame delay between the previous cumulative motion vector F(n−1), and the current cumulative motion vector F(n). This delay is attributable to the calculation of the frame having a V(n) frame-level displacement and its adaptive integration with F(n−1).

In traditional image stabilization techniques, the previous motion estimation F(n−1) and the current frame-level motion vector V(n) is integrated by the following equation:

$$F(n) = [k \times F(n-1)] + V(n)$$

Where the "weighting factor" k<1 is a constant. This equation is an auto-regressive (AR) process. AR models include past observations of the dependent variable in the forecast of future observations. Thus, the previous global-motion vector F(n−1) is always used in the calculation of the current cumulative frame-level vector. The equation can be implemented by a single-pole, low pass filter, in part because the handshaking of video capturing is a low-frequency event (ordinarily less than about fifteen hertz). The constant k controls the damping rate of the low-pass filter and is used to ensure that the "cut out" (i.e., the cropped and zoomed) image is slowly moving to the center of the padded image. The constant k can also be considered to be the relative weight of the history, or past, in integrating the current frame-level motion vector V(n).

In this traditional model, however, there is no provision that takes into account the adaptive nature of integrating the displacement vectors. For example, the traditional method fails to take into account that if the current displacement V(n) is equal to the margin of the image sensor, the history does not matter (see equation 67 in FIG. 4). Instead, the traditional method takes the history into account in that instant, resulting in unnecessary inaccuracies. Further, If the current displacement is zero, then the past motion or history would be used completely (see equation 63 in FIG. 4). This is not the case in the traditional method, which reduces the history by a factor of k, which results in inaccuracies. Additionally, if the current displacement V(n) is in a different direction than the historical displacement, then the current and historical displacements should be added to compensate for camera shake. The traditional method, again, reduces the historical displacement by a factor of k prior to the addition, which again reduces inaccuracies. All of these inaccuracies are simply magnified by a smaller handheld device, which results in larger amounts of camera shake. Plainly, an adaptive integration should be used as in step 47 of FIG. 3 and in FIG. 4. Moreover, a linear interpolation of k is more appropriate than a constant k, as shown in equation 61 of FIG. 4. In that equation:

$$K = (1 - V(n)/M)$$

It should be noted that F(n) is also called a cumulative motion vector, which refers to a motion vector corresponding to the current motion vector and previous motion vectors from the plurality adaptively integrated together. Further, the term circuit can broadly encompass any type of electrical hardware to perform a function, such as a collection of active components, active and passive components, one or more processors, one or more DSPs, or software run on one or more controllers.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of stabilizing an image comprising a plurality of sequential frames, comprising:

estimating a plurality of motion vectors, each motion vector corresponding to one of the frames;

adaptively integrating each of the motion vectors with the motion vectors corresponding to the previous frames using a stabilizer circuit; and using the adaptively integrated motion vectors to compensate the frames to stabilize the image, wherein the adaptive integration comprises setting one of the adaptively integrated motion vectors equal to the sum of said one of the adaptively integrated motion vectors and the adaptively integrated motion vector corresponding to the previous frame when the product of said one of adaptively integrated motion vectors and the adaptively integrated motion vector corresponding to the previous flame is less than zero.

2. A method of stabilizing an image comprising a plurality of sequential frames, comprising:
   estimating a plurality of motion vectors, each motion vector corresponding to one of the frames;
   adaptively integrating each of the motion vectors with the motion vectors corresponding to the previous frames using a stabilizer circuit; and
   using the adaptively integrated motion vectors to compensate the frames to stabilize the image,
   wherein the adaptive integration comprises setting one of the adaptively integrated motion vectors equal to a margin having the sign of the adaptively integrated motion vector corresponding to the previous frame when the absolute value of the sum of said one of the adaptively integrated motion vectors and the adaptively integrated motion vector corresponding to the previous frame is greater than the margin.

3. A method of stabilizing an image comprising a plurality of sequential frames, comprising:
   estimating a plurality of motion vectors, each motion vector corresponding to one of the frames;
   adaptively integrating each of the motion vectors with the motion vectors corresponding to the previous frames using a stabilizer circuit; and
   using the adaptively integrated motion vectors to compensate the frames to stabilize the image,
   wherein the adaptive integration comprises setting each of the adaptively integrated motion vectors F(n) equal to $$[(1-V(n)/M) \times F(n-1)] + V(n)$$

when $|V(n)+F(n-1)| < M$, where

V(n) equals one of the motion vectors, M equals the margin, and F(n−1) equals the adaptively integrated motion vector corresponding to the previous frame.

4. A method for image stabilization of an image sequence comprising n frames, comprising:
   storing each frame from an image sensor into a reference buffer;
   estimating a frame-level motion vector V(n) for each of the n frames;
   selecting an integration approach for each frame-level motion vector based upon components associated with the frame-level motion vector;
   generating adaptively, according to the selecting, integrated motion vectors F(n) for each of the n frames based on V(n) and a motion vector F(n−1) corresponding to the previous n−1 frames using a stabilizer circuit, wherein the generating further comprises at least one of: setting one of the adaptively integrated motion vectors equal to the sum of one of the adaptively integrated motion vectors and the adaptively integrated motion vector corresponding to a previous frame when a product of said one of adaptively integrated motion vectors and the adaptively integrated motion vector corresponding to the previous frame is less than zero,
   setting one of the adaptively integrated motion vectors equal to a margin having a sign of the adaptively integrated motion vector corresponding to the previous frame when an absolute value of the sum of said one of the adaptively integrated motion vectors and the adaptively integrated motion vector corresponding to the previous frame is greater than the margin, or
   setting each of the adaptively integrated motion vectors F(n) equal to $$[(1-V(n)/M) \times F(n-1)] + V(n)$$

when $|v(n)+F(n-1)| < M$, where

M equals the margin; and
   rendering each of the frames as a video sequence by displacing, when necessary, the nth frame in the reference buffer by F(n).

5. The method of claim 4, wherein the estimating the frame-level motion vector V(n) comprises:
   generating, for each nth frame, a plurality of motion vectors, each motion vector corresponding to a specific area of the frame;
   generating vertical and horizontal components of a histogram of the plurality of motion vectors corresponding to each nth frame; and
   computing the frame-level vector V(n) based on the histogram.

6. The method of claim 4 further comprising padding the perimeter of the image sensor with a margin.

7. A method for image stabalization of an image sequence comprising n frames, comprising:
   storing each frame from an image sensor into a reference buffer; estimating a frame-level motion vector V(n) for each of the n frames;
   generating adaptively integrated motion vectors F(n) for each of the n frames based on V(n) and a motion vector F(n−I) corresponding to the previous n−1 frames using a stabalizer circuit; and
   rendering each of the n frames as a video sequence by displacing, when necessary, the nth frame in the reference buffer by F(n),
   wherein the generating adaptively integrated motion vectors F(n) comprises setting the following values:

$F(n)=F(n-1)$ when $V(n)=0$;

$F(n)=V(n)+F(n-1)$ when $V(n) \times F(n-1) < 0$;

$F(n)=\text{sgn}(V(n)) \times M$, when $|V(n)+F(n-1)| \geq M$, where $M = \text{margin}$;

$F(n)=[(1-V(n)/M)=F(n-1)]+V(n)$ when $|V(n)+F(n-1)| < M$.

8. The method of claim 7, wherein the horizontal and vertical directions of each vector F(n), V(n), and F(n+1) are computed separately.

9. An image stabilization apparatus for use in a device capable of capturing video, comprising:
   an image sensor for capturing video frames comprising an image sequence;
   a buffer coupled to the image sensor for storing a reference image associated with a captured frame;
   a motion estimation circuit coupled to the buffer and operative to compute a motion vector for each frame;
   an adaptive integration circuit coupled to the motion estimation circuit and operative to adaptively integrate the motion vectors associated with each frame to output a cumulative motion vector for each frame; and
   a rendering circuit coupled to the buffer and the adaptive integration circuit and operative to copy a stabilized portion of the image sequence,
   wherein the adaptive integration circuit is further operative to compute F(n)=V(n)+F(n−1) when V(n)=F(n)<0.

10. An image stabilization apparatus for use in a device capable of capturing video, comprising:
- an image sensor for capturing video frames comprising an image sequence;
- a buffer coupled to the image sensor for storing a reference image associated with a captured frame;
- a motion estimation circuit coupled to the buffer and operative to compute a motion vector for each frame;
- an adaptive integration circuit coupled to the motion estimation circuit and operative to adaptively integrate the motion vectors associated with each frame to output a cumulative motion vector for each frame; and
- a rendering circuit coupled to the buffer and the adaptive integration circuit and operative to copy a stabilized portion of the image sequence,
- wherein the adaptive integration circuit is further operative to compute $F(n)=\text{sgn}(V(n)) \times M$ when $|V(n)+F(n-1)| \geq M$.

11. An image stabilization apparatus for use in a device capable of capturing video, comprising:
- an image sensor for capturing video frames comprising an image sequence;
- a buffer coupled to the image sensor for storing a reference image associated with a captured frame;
- a motion estimation circuit coupled to the buffer and operative to compute a motion vector for each frame;
- an adaptive integration circuit coupled to the motion estimation circuit and operative to adaptively integrate the motion vectors associated with each frame to output a cumulative motion vector for each frame; and
- a rendering circuit coupled to the buffer and the adaptive integration circuit and operative to copy a stabilized portion of the image sequence,
- wherein the adaptive integration circuit is further operative to compute $F(n)=(1-V(n)/M)F(n-1)+V(n)$ when $|V(n)+F(n-1)|<M$.

12. An apparatus for stabilizing an image comprising a plurality of sequential frames, comprising:
- means for estimating a plurality of motion vectors, each motion vector corresponding to one of the frames;
- means for adaptively integrating each of the motion vectors with the motion vectors corresponding to the previous frames; and
- means for using the adaptively integrated motion vectors to compensate the frames to stabilize the image,
- wherein the adaptive integration comprises means for setting one of the adaptively integrated motion vectors equal to the sum of said one of the adaptively integrated motion vectors and the adaptively integrated motion vector corresponding to the previous frame when the product of said one of adaptively integrated motion vectors and the adaptively integrated motion vector corresponding to the previous frame is less than zero.

13. An apparatus for stabilizing an image comprising a plurality of sequential frames, comprising:
- means for estimating a plurality of motion vectors, each motion vector corresponding to one of the frames;
- means for adaptively integrating each of the motion vectors with the motion vectors corresponding to the previous frames; and
- means for using the adaptively integrated motion vectors to compensate the frames to stabilize the image,
- wherein the adaptive integration comprises means for setting one of the adaptively integrated motion vectors equal to a margin having the sign of the adaptively integrated motion vector corresponding to the previous frame when the absolute value of the sum of said one of the adaptively integrated motion vectors and the adaptively integrated motion vector corresponding to the previous frame is greater than the margin.

14. An apparatus for stabilizing an image comprising a plurality of sequential frames, comprising:
- means for estimating a plurality of motion vectors, each motion vector corresponding to one of the frames;
- means for adaptively integrating each of the motion vectors with the motion vectors corresponding to the previous frames; and
- means for using the adaptively integrated motion vectors to compensate the frames to stabilize the image,
- wherein the adaptive integration comprises means for setting each of the adaptively integrated motion vectors $F(n)$ equal to $$[(1-V(n)/M)=F(n-1)]+V+(n)$$

when $|v(n)+F(-1)|<M$, where $V(n)$ equals one of the motion vectors, M equals the margin, and $F(n-1)$ equals the adaptively integrated motion vector corresponding to the previous frame.

15. An apparatus for image stabilization of an image sequence comprising n frames, comprising:
- means for storing each frame from an image sensor into a reference buffer;
- means for estimating a frame-level motion vector $V(n)$ for each of the n frames;
- means for selecting an integration approach for each frame-level motion vector based upon components associated with the frame-level motion vector;
- means for generating adaptively, according to the means for selecting, integrated motion vectors $F(n)$ for each of the n frames based on $V(n)$ and a motion vector $F(n-1)$ corresponding to the previous n−1 frames, wherein the means for generating further comprises at least one of:
  - means for setting one of the adaptively integrated motion vectors equal to the sum of one of the adaptively integrated motion vectors and the adaptively integrated motion vector corresponding to a previous frame when a product of said one of adaptively integrated motion vectors and the adaptively integrated motion vector corresponding to the previous frame is less than zero,
  - means for setting one of the adaptively integrated motion vectors equal to a margin having a sign of the adaptively integrated motion vector corresponding to the previous frame when an absolute value of the sum of said one of the adaptively integrated motion vectors and the adaptively integrated motion vector corresponding to the previous frame is greater than the margin, or
  - means for setting each of the adaptively integrated motion vectors $F(n)$ equal to $$[(1-V(n)/M)=F(n-1)]+V(n)$$

when $|V(n)+F(n-1)|<M$, where

M equals the margin; and
- means for rendering each of the n frames as a video sequence by displacing, when necessary, the nth frame in the reference buffer by $F(n)$.

16. The apparatus of claim 15, wherein the means for estimating the frame-level motion vector $V(n)$ comprises:
- means for generating, for each nth frame, a plurality of motion vectors, each motion vector corresponding to a specific area of the frame;

means for generating vertical and horizontal components of a histogram of the plurality of motion vectors corresponding to each nth frame; and
means for computing the frame-level vector V(n) based on the histogram.

17. The apparatus of claim 15, further comprising means for padding the perimeter of the image sensor with a margin.

18. An apparatus for image stabilization of an image sequence comprising n frames, comprising:
means for storing each frame from an image sensor into a reference buffer;
means for estimating a frame-level motion vector V(n) for each of the n frames;
means for generating adaptively integrated motion vectors F(n) for each of the n frames based on V(n) and a motion vector F(n−1) corresponding to the previous n−1 frames; and
means for rendering each of the n frames as a video sequence by displacing, when necessary, the nth frame in the reference buffer by F(n),
wherein the means for generating adaptively integrated motion vectors F(n) comprises means for setting the following values:

$F(n)=F(-1)$ when $V(n)=0$;

$F(n)=V(n)+F(n-1)$ when $V(n)\times F(n-1)<0$;

$F(n)=\text{sgn}(V(n))\times M$, when $|V(n)+F(n-1)|\geq M$, where $M=\text{margin}$;

$F(n)=[(1-V(n)/M)\times F(n-1)]+V(n)$ when $|V(n)+F(n-1)|<M$.

19. The apparatus of claim 18, wherein the horizontal and vertical directions of each vector F(n), V(n), and F(n+1) are computed separately.

20. A non-transitory computer readable medium having program code executable by a processor to perform image stabilization of an image comprising a plurality of sequential frames, comprising:
program code to estimate a plurality of motion vectors, each motion vector corresponding to one of the frames;
program code to adaptively integrate each of the motion vectors with the motion vectors corresponding to the previous frames; and
program code to use the adaptively integrated motion vectors to compensate the frames to stabilize the image,
wherein the adaptive integration comprises program code to set one of the adaptively integrated motion vectors equal to the sum of said one of the adaptively integrated motion vectors and the adaptively integrated motion vector corresponding to the previous frame when the product of said one of adaptively integrated motion vectors and the adaptively integrated motion vector corresponding to the previous frame is less than zero.

21. A non-transitory computer readable medium having program code executable by a processor to perform image stabilization of an image comprising a plurality of sequential frames, comprising:
program code to estimate a plurality of motion vectors, each motion vector corresponding to one of the frames;
program code to adaptively integrate each of the motion vectors with the motion vectors corresponding to the previous frames; and
program code to use the adaptively integrated motion vectors to compensate the frames to stabilize the image, wherein the adaptive integration comprises program code to set one of the adaptively integrated motion vectors equal to a margin having the sign of the adaptively integrated motion vector corresponding to the previous frame when the absolute value of the sum of said one of the adaptively integrated motion vectors and the adaptively integrated motion vector corresponding to the previous frame is greater than the margin.

22. A non-transitory computer readable medium having program code executable by a processor to perform image stabilization of an image comprising a plurality of sequential frames, comprising:
program code to estimate a plurality of motion vectors, each motion vector corresponding to one of the frames;
program code to adaptively integrate each of the motion vectors with the motion vectors corresponding to the previous frames; and
program code to use the adaptively integrated motion vectors to compensate the frames to stabilize the image,
wherein the adaptive integration comprises program code to set each of the adaptively integrated motion vectors F(n) equal to $[(1-V(n)/M)\times F(n-1)]+V(n)$ when $|V(n)+F(n-1)|<M$, where V(n) equals one of the motion vectors, M equals the margin, and F(n−1) equals the adaptively integrated motion vector corresponding to the previous frame.

23. A non-transitory computer readable medium having program code executable by a processor to perform image stabilization of an image sequence comprising n frames, comprising:
program code to store each frame from an image sensor into a reference buffer;
program code to estimate a frame-level motion vector V(n) for each of the n frames;
program code to select an integration approach for each frame-level motion vector based upon components associated with the frame-level motion vector;
program code to generate adaptively, according to the program code to select, integrated motion vectors F(n) for each of the n frames based on V(n) and a motion vector F(n−1) corresponding to the previous n−1 frames, wherein the program code to generate further comprises at least one of:
program code to set one of the adaptively integrated motion vectors equal to the sum of one of the adaptively integrated motion vectors and the adaptively integrated motion vector corresponding to a previous frame when a product of said one of adaptively integrated motion vectors and the adaptively integrated motion vector corresponding to the previous frame is less than zero,
program code to set one of the adaptively integrated motion vectors equal to a margin having a sign of the adaptively integrated motion vector corresponding to the previous frame when an absolute value of the sum of said one of the adaptively integrated motion vectors and the adaptively integrated motion vector corresponding to the previous frame is greater than the margin, or
program code to set each of the adaptively integrated motion vectors F(n) equal to $[(1-V(n)/M)\times F(n-1)]+V(n)$ when $|V(n)+F(n-1)|<M$, where M equals the margin; and program code to render each of the n frames as a video sequence by displacing, when necessary, the nth frame in the reference buffer by F(n).

24. The non-transitory computer readable medium of claim 23, wherein the program code to estimate the frame-level motion vector V(n) comprises:

program code to generate, for each nth frame, a plurality of motion vectors, each motion vector corresponding to a specific area of the frame;

program code to generate vertical and horizontal components of a histogram of the plurality of motion vectors corresponding to each nth frame; and program code to compute the frame-level vector V(n) based on the histogram.

25. The non-transitory computer readable medium of claim 23 further comprising program code to pad the perimeter of the image sensor with a margin.

26. A non-transitory computer readable medium having program code executable by a processor to perform image stabilization of an image sequence comprising n frames, comprising:

program code to store each frame from an image sensor into a reference buffer;

program code to estimate a frame-level motion vector V(n) for each of the n frames;

program code to generate adaptively integrated motion vectors F(n) for each of the n frames based on V(n) and a motion vector F(n−1) corresponding to the previous n−1 frames; and program code to render each of the n frames as a video sequence by program code to displac, when necessary, the nth frame in the reference buffer by F(n), wherein the program code to generate adaptively integrated motion vectors F(n) comprises program code to set the following values:

$F(n)=F(n-1)$ when $V(n)=0$;

$F(n)=V(n)+F(n-1)$ when $V(n) \times F(n-1)<0$;

$F(n)=sgn(V(n)) \times M$, when $|V(n)+F(n-1)| \geqq M$, where M=margin;

$F(n)=[(1-V(n)/M) \times F(n-1)]+V(n)$ when $|V(n+F(n-1)|<M$.

27. The non-transitory computer readable medium of claim 26, wherein the horizontal and vertical directions of each vector F(n), V(n), and F(n+1) are computed separately.

* * * * *